March 1, 1938. A. M. DIEZ ET AL 2,110,038
SHIFTING MECHANISM
Filed Nov. 30, 1936
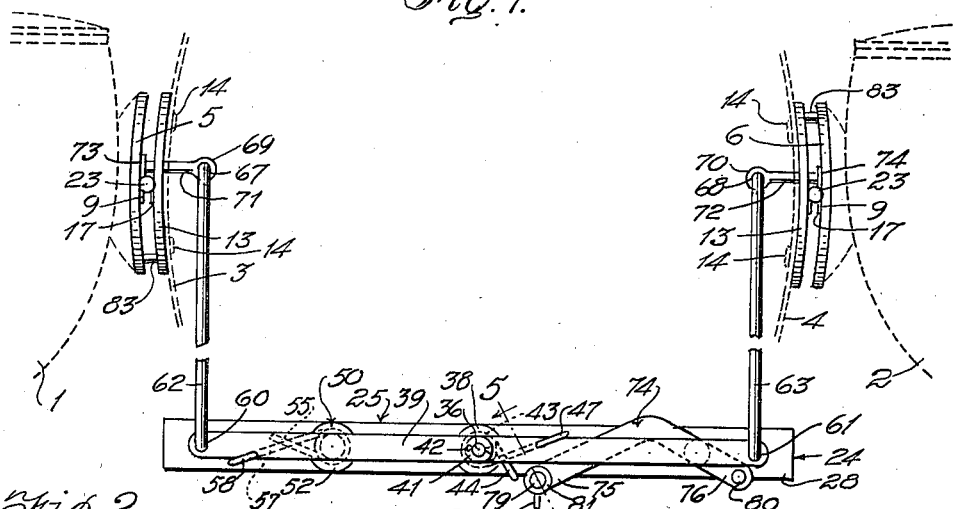
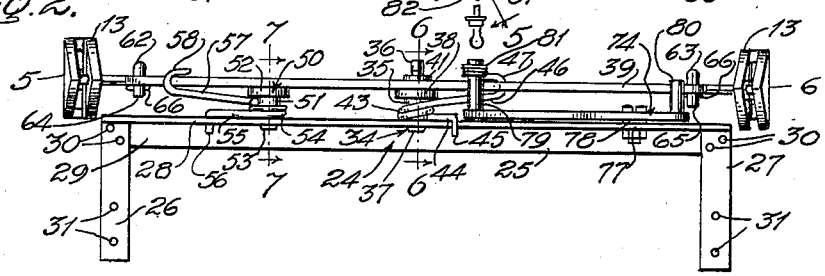
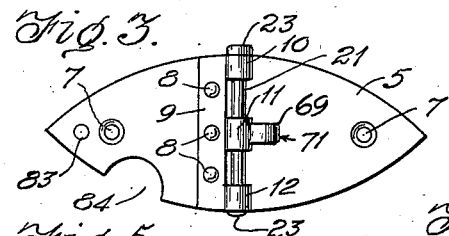 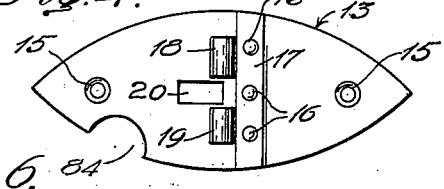
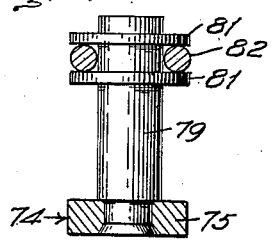 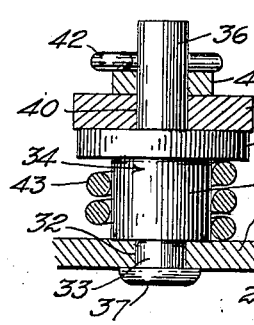
Inventors
Angel M. Diez and
Trude Neuhaus-May,
By Kimmel & Crowell
Attorneys Patented Mar. 1, 1938

2,110,038

UNITED STATES PATENT OFFICE 2,110,038

SHIFTING MECHANISM

Angel M. Diez and Trude Neuhaus May, Mexico, D. F., Mexico

Application November 30, 1936, Serial No. 113,493
In Mexico September 30, 1936

2 Claims. (Cl. 240—61.7)

This invention relates to a shifting mechanism designed primarily for use in connection with the headlights of automative vehicles, but it is to be understood that the shifting mechanism, in accordance with this invention, is for use for any purpose for which it may be found applicable.

The invention aims to provide, in a manner as hereinafter set forth, a normally inactive spring controlled manually operable shifting mechanism for connection with the headlights of and for installation in the body of an automotive vehicle, and providing, when shifted from normal, to simultaneously move the headlights to the right at an angle whereby the light rays will be directed in a manner to prevent the sight of a driver of an oncoming vehicle from being dazzled or blinded resulting in materially reducing the possibility of collisions to a minimum, as well as providing for illuminating the right side of the road and curves, thereby increasing visibility and insuring for safe driving.

Further objects of the invention are to provide, in a manner as hereinafter set forth, a shifting mechanism for the headlights of automotive vehicles which is comparatively simple in its construction and arrangement, strong, durable, compact, thoroughly efficient in its use, easily operated for shifting the headlights, readily assembled, having the major portion thereof protected by part of the automotive vehicle and comparatively inexpensive to manufacture.

With the foregoing and other objects which may hereinafter appear, the invention consists of the novel construction and arrangement of parts as will be more specifically described and are as illustrated in the accompanying drawing, wherein is shown an embodiment of the invention, but it is to be understood that changes, variations and modifications may be resorted to which fall within the scope of the invention as claimed.

The spring controlled normally shiftable mechanism for headlights, in accordance with this invention, may be installed in an automotive vehicle while the latter is being built or it may be installed in an automotive vehicle after the latter has been built if its headlights are of the type with which the mechanism may be used.

In the drawing:

Figure 1 is a top plan view of a spring controlled manually operable shifting mechanism for the headlights of an automotive vehicle. The headlights as well as portions of the engine hood or motor case are shown in dotted lines, Figure 2 is a rear elevation of said mechanism, Figure 3 is an elevation looking towards the inner face of the form of the shiftable hanger elements for the headlights, Figure 4 is an elevation looking towards the outer face of the form of fixed suspension elements for the hanger elements, Figure 5 is a section on line 5—5, Figure 1, Figure 6 is a section on line 6—6, Figure 2, and Figure 7 is a section on line 7—7, Figure 2.

With reference to Figure 1, the headlights, indicated at 1, 2, are pivotally mounted in a known manner adjacent the sides of the radiator of the vehicle. The forward ends of the sides of the engine hood or motor case are indicated at 3, 4.

The manually operated spring controlled headlight shifting mechanism, in accordance with this invention, includes a pair of oppositely disposed hanger elements 5, 6 of like form. Each of said elements, when looking towards their inner face, is of elliptical contour as here shown but may be of any shape desired. The elements 5, 6 in plan are of segmental contour as shown but may be of any form found suitable. Each hanger element is formed with spaced openings 7 for the passage of holdfast devices to fixedly secure the element to the inner side of a headlight. The hanger elements are disposed on their lower lengthwise edges and each has secured to its inner face, at one side of its vertical median, by the holdfast means 8 a strap 9 provided on one of its side edges with a series of spaced superposed aligning barrels 10, 11 and 12. Coacting with each hanger element and opposing the inner face of the latter is a stationary suspension element 13 for the hanger element. The element 13 corresponds in contour to a side 3 or 4 of the motor case and is fixedly secured to the outer face of such side by holdfast means 14 extending through the openings 15 formed in the body of the element 13. The element 13 is here shown of elliptical contour and segmental in plan but may be of any form and contour suited to the place of attachment. The outer face of the body of element 13 has secured thereto by the holdfast devices 16 a strap 17 having one of its side edges provided with a pair of spaced parallel superposed barrels 18, 19. The element 13 is formed with a rectangular or other slot 20 intersected by the longitudinal median of the element and extending partly in the space between the barrels 18, 19. A hanger element is maintained in spaced relation by the barrels 10, 11, 12 of the hanger element and the barrels 18, 19 of the suspension element. The barrels 18, 19 of the suspension element are interposed between the barrels 10, 11 and 12 of the hanger element. The barrels 10, 11 and 12 align with the barrels 18, 19. Extending through the aligning barrels is a pivot bar 21 which has its ends provided with suitable means, as at 23, for connecting it to a hanger element. The latter is hinged to the suspension element by the barrels 10, 11, 12, 18 and 19 in connection with the pivot bar 21. When a hanger element is hinged to a suspension element the straps 9, 17 are arranged in spaced parallel relation. A hanger element is shiftable relative to a suspension element and when the hanger element is shifted the headlight which is anchored thereto is carried therewith.

Connected to the chassis, not shown, of the vehicle is an upstanding inverted yoke-shaped support 24 consisting of a top member 25 of angle-shape cross section and a pair of vertically disposed side members 26, 27 which abut the horizontal flange 28 of the member 24 and are also positioned against the rear face of the flange 29 of member 25. The members 26, 27 are secured to the flange 29 by the holdfast means 30. The members 26, 27 are provided with openings 31 for the passage of holdfast means for anchoring the support 24 to the chassis of the vehicle. The support 24 is to be arranged substantially at the rear of the motor case. Since the members 25, 26 and 27 form merely a base for supporting parts of the device, these members are not limited in form and arrangement to the form and arrangement here shown but may be of any form adapted for the purpose.

The flange 28 of the top member 25, at its center is formed with an opening 32 and extending through said opening is the reduced lower portion 33 of a vertical post 34. The latter includes an enlarged intermediate portion 35 and a reduced upper portion 36 of greater length than the portion 33. The latter, at its lower end, is upset, as at 37, against the lower face of the flange 28. The post 34 is of circular cross section and it also includes an intermediate portion 38 of greater diameter and of less length than the portion 35. The latter is of greater diameter than the portions 33, 36. Mounted on the top and supported by the portion 38 of the post 34 is an actuating lever 39 formed centrally with an opening 40 through which extends the portion 36 of post 34. Mounted on portion 36 and seated on lever 39 is a washer 41. Extending diametrically through the portion 36 of post 34 and arranged above washer 31 is a cotter pin 42.

Surrounding the portion 35 of the post 34 and interposed between the portions 38 and post 34 of the flange 28 of member 25 is a coil controlling spring 43. One end of spring 43 is extended, as at 44, and bent, as at 45, to engage the rear edge of flange 28 of member 25. The other end of spring 43 is extended, as at 46, and bent, as at 47, to overlap the lever 39 at the forward edge of the latter.

The flange 28 of member 5, at a point between the opening 32 and one side edge thereof, is formed with an opening 48 through which extends the reduced lower end 49 of vertical post 50. The latter includes an intermediate portion 51 and a top portion 52. The post 50 is of circular cross section and has its portion 51 of materially greater diameter than its portion 49 and its portion 52 of materially greater diameter than its portion 51. The portion 52 of post 50 aligns with the portion 38 of post 34. The lower end of the portion 49 is upset, as at 53, and binds against the lower face of the flange 28. Surrounding the portion 51 of post 50 is a coil controlling spring 54 having one end extended, as at 55, and bent, as at 56, to abut the front of the member 25. The other end of the spring 54 is extended, as at 57, and is bent, as at 58, to overlap the lever 39 and abut the rear edge of the latter. The portion 52 of the post 54 provides a support for lever 39. The portion 38 of post 34 and the portion 52 of post 50 maintains the lever 39 in superposed relation with respect to the member 25 of support 24. The lever 39, in proximity to each end thereof, is formed with an opening and the said openings are indicated at 60, 61.

The mechanism includes horizontally disposed controlling rods 62, 63 having vertically disposed downwardly extending rear end terminal portions 64, 65 respectively which depend through the openings 60, 61 respectively and are connected to the lever 39 by the cotter pins 66. The rods 62, 63 extend forwardly from the lever 39 and are loosely connected, as at 67, 68, to the eyes 69, 70 formed on the inner ends of a pair of shifting elements 71, 72 respectively which extend through the openings 20 in the suspension elements 13 and are fixedly secured, as at 73, 74, to the inner faces of the hanger elements 5, 6 respectively.

There is associated with the actuating lever 39 an operating lever therefor. The operating lever is indicated generally at 74 and is formed of a pair of arms 75, 76 disposed at opposite outward inclinations with respect to each other. The arms of lever 74 are interposed between lever 39 and the member 25 of support 24. The arm 75 of lever 74 is of greater length than the arm 76. The latter, intermediate its ends, is pivotally connected, as at 77, to the flange 28 of the member 25 between the opening 32 and the other side edge of flange 28. The lever 74 is arranged in close proximity to the upper face of the flange 28 of member 25 and is maintained in spaced relation relative to flange 28 by a washer 78. The arms 75, 76 of lever 74 extend rearwardly beyond the rear lengthwise edge of flange 28. The rear ends of the arms 75, 76 have anchored thereto vertically disposed posts 79, 80 respectively. The posts 79, 80 are arranged rearwardly of the rear lengthwise edge of lever 39 and extend above lever 39. The post 79 is of greater height and thickness than the post 80 and has fixed thereto, in proximity to its upper end, a pair of spaced parallel collars 81 which connect a pulling element 82 to post 79. The element 82 is of a length to extend into the vehicle and is under the control of the driver.

The movable elements of the mechanism are maintained normally by the springs 53, 54 in the position shown in Figure 1. These springs also act to restore the movable elements of the mechanism after the latter has been shifted to the position shown in Figure 1.

By pulling the element 82 rearwardly, the post 80 will contact with the lever 39 and shift the latter in a manner to move the pull rod 63 forward and the pull rod 62 rearward. When the rods move in such direction the headlight 2 is shifted at an angle to the right and simultaneously with the shifting of the headlight 2 in a manner as stated the headlight 1 will be shifted at an angle to the right.

A hanger element and its associated suspension element are further maintained in spaced relation by a stop 83 on the outer face of the hanger element near one end of the latter and which abuts the outer face of its associated suspension element near one end of the latter.

Although the preferred contour and arrangement of the operating lever 74 is as shown, yet it may be of any suitable contour and arrangement which is capable, when pulled, of operating the lever 39.

The springs which engage with the lever 39 also function to return the headlights to the normal position thereof.

The pull element 82 and the automobile may be provided with any suitable coacting means for detachably holding element 82 in pulled position when desired.

The elements 5, 6 and 13 may be notched at their lower edges as at 84 to provide passage for the light cables carrying current to the headlights.

What we claim is:

1. In a mechanism for simultaneously shifting a pair of vehicle headlights in a like direction, a support adapted to be fixedly secured to and transversely of the chassis of the vehicle at a point intermediate the ends of the chassis, a pair of shiftable hanger elements, each fixed to the inner side of a headlight, a pair of stationary suspension elements each adapted to be fixedly secured to the forward part of the outer face of a side of a motor case, means for hinging the hanger elements to the suspension elements, said means constituting suspensions for the hanger elements, a spring controlled pivotally supported actuating element arranged over said support, a pair of spaced controlling rods extending forwardly from and connected to the ends of said actuating element, a pair of oppositely disposed shifting elements adapted to extend through the sides of the motor case, said shifting elements loosely connected to the forward ends of said rods, extending through the suspension elements adjacent to said hinging means and fixedly secured to said hanger elements, and an operating lever pivotally connected to said support and provided with means for shifting the actuating element to provide for said rods and shiftable hanger elements shifting said headlights simultaneously in a like direction.

2. The invention as set forth in claim 1 having the means on said operating lever being in the form of a post at one end of said lever for riding against an edge of said actuating element.

ANGEL M. DIEZ.
TRUDE NEUHAUS MAY.